US010317426B2

(12) United States Patent
Coronato et al.

(10) Patent No.: US 10,317,426 B2
(45) Date of Patent: Jun. 11, 2019

(54) ACCELEROMETER COMMON MODE SELF-TEST

(71) Applicant: PANASONIC CORPORATION, Osaka (JP)

(72) Inventors: Luca Coronato, Corsico (IT); Giacomo Gafforelli, Casatenovo (IT); Adolfo Giambastiani, San Marco (IT); Federico Mazzarella, Binasco (IT); Massimiliano Musazzi, Como (IT); Michele Folz, Pavia (IT)

(73) Assignee: PANASONIC CORPORATION, Osaka (JP)

(*) Notice: Subject to any disclaimer, the term of this patent is extended or adjusted under 35 U.S.C. 154(b) by 218 days.

(21) Appl. No.: 15/370,385

(22) Filed: Dec. 6, 2016

(65) Prior Publication Data
US 2017/0168088 A1    Jun. 15, 2017

Related U.S. Application Data

(60) Provisional application No. 62/265,906, filed on Dec. 10, 2015.

(51) Int. Cl.
*G01P 21/00* (2006.01)
*G01P 15/125* (2006.01)

(52) U.S. Cl.
CPC ............ *G01P 21/00* (2013.01); *G01P 15/125* (2013.01)

(58) Field of Classification Search
CPC ....................................................... G01P 21/00
USPC ................... 73/1.38, 514.18, 514.32, 514.35; 340/635, 653, 669; 361/280
See application file for complete search history.

(56) References Cited

U.S. PATENT DOCUMENTS

| | | | |
|---|---|---|---|
| 6,393,913 B1 * | 5/2002 | Dyck | G01P 15/0802 333/186 |
| 2001/0032508 A1 | 10/2001 | Lemkin et al. | |
| 2002/0008527 A1 * | 1/2002 | Broillet | G01H 11/08 324/727 |
| 2010/0251800 A1 | 10/2010 | Mueck | |
| 2013/0265070 A1 | 10/2013 | Kleks et al. | |
| 2014/0096587 A1 * | 4/2014 | Stewart | G01P 15/125 73/1.38 |
| 2016/0077132 A1 | 3/2016 | Geneste et al. | |

* cited by examiner

*Primary Examiner* — Robert R Raevis
(74) *Attorney, Agent, or Firm* — McDermott Will & Emery LLP

(57) ABSTRACT

An accelerometer has a plurality of proof masses and a plurality of sense electrodes, which collectively form at least two capacitors. A first sense drive signal is applied to a first capacitor and a second sense drive signal is applied to a second capacitor. Both of the sense drive signals have the same sense drive frequency. Capacitance signals are sensed from each of the first capacitor and second capacitor, and a common mode component of the capacitance signals is determined. A capacitor error is identified based on the common mode component.

20 Claims, 7 Drawing Sheets

ACCELEROMETER COMMON MODE SELF-TEST

CROSS REFERENCE TO OTHER APPLICATIONS

This application claims priority to U.S. Provisional Patent Application No. 62/265,906 entitled "Accel C2V Common Mode Check," filed Dec. 10, 2015, which is incorporated herein by reference for all purposes.

BACKGROUND

Numerous items such as smart phones, smart watches, tablets, automobiles, aerial drones, appliances, aircraft, exercise aids, and game controllers may utilize motion sensors during their operation. In many applications, various types of motion sensors such as accelerometers and gyroscopes may be analyzed independently or together in order to determine varied information for particular applications. For example, gyroscopes and accelerometers may be used in gaming applications (e.g., smart phones or game controllers) to capture complex movements by a user, drones and other aircraft may determine orientation based on gyroscope measurements (e.g., roll, pitch, and yaw), and vehicles may utilize measurements for determining direction (e.g., for dead reckoning) and safety (e.g., to recognize skid or roll-over conditions).

Motion sensors such as accelerometers and gyroscopes may be manufactured as microelectromechanical (MEMS) sensors that are fabricated using semiconductor manufacturing techniques. A MEMS sensor may include movable proof masses that can respond to forces such as linear acceleration (e.g., for MEMS accelerometers) and angular velocity (e.g., for MEMS gyroscopes). The operation of these forces on the movable proof masses may be measured based on the movement of the proof masses in response to the forces. In some implementations, this movement is measured based on distance between the movable proof masses and sense electrodes, which form capacitors for sensing the movement. These capacitors may be implemented in a variety of manners, such as with the adjacent proof mass and sense electrode forming capacitive plates or with interdigitated sense combs. A component of the capacitor such as a proof mass, sense electrode, or sense comb may be manufactured with a defect or may become damaged during operation. As a result, the capacitance that is associated with a particular linear acceleration will be different than the expected capacitance, resulting in errors in the measurement of linear acceleration.

SUMMARY OF THE INVENTION

In an exemplary embodiment of the present disclosure, a system for identifying a capacitor error of an accelerometer may comprise a first proof mass suspended to move along a sense axis in response to a linear acceleration along the sense axis, a second proof mass suspended to move along the sense axis in response to a linear acceleration along the sense axis, a first sense electrode located adjacent to the first proof mass, and a second sense electrode located adjacent to the second proof mass. The first sense electrode and the first proof mass may comprise a first capacitor and second sense electrode and the second proof mass may comprise a second capacitor. In an embodiment, processing circuitry may be coupled to the first proof mass, the second proof mass, the first sense electrode, and the second sense electrode to apply a first sense drive signal having a sense drive frequency to the first capacitor and a second sense drive signal having the sense drive frequency to the second capacitor, to receive a capacitance signal from each of the first and second capacitors, to identify a common mode signal for the capacitance signals, and to identify the capacitor error based on the common mode signal.

In an exemplary embodiment of the present disclosure, a method for identifying a capacitor error of an accelerometer may comprise applying a first sense drive signal having a sense drive frequency to a first capacitor, wherein the first capacitor comprises a first proof mass suspended to move along a sense axis in response to a linear acceleration along the sense axis and a first sense electrode located adjacent to the first proof mass. The method may further comprise applying a second sense drive signal having the sense drive frequency to a second capacitor, wherein the second capacitor comprises a second proof mass suspended to move along the sense axis in response to a linear acceleration along the sense axis and a second sense electrode located adjacent to the second proof mass. The method may further comprise receiving a capacitance signal from each of the first and second capacitors, identifying a common mode signal for the capacitance signals, and identifying the capacitor error based on the common mode signal.

In an exemplary embodiment of the present disclosure, a system for identifying a capacitor error of an accelerometer may comprise at least two first sense electrodes, wherein a first sense drive signal having a sense drive frequency is applied to each of the first sense electrodes, and at least two second sense electrodes, wherein a second sense drive signal having the sense drive frequency is applied to each of the second sense electrodes, and wherein the first sense drive signal and the second sense drive signal are differential signals. The system may further comprise a first proof mass, wherein the first proof mass is located adjacent to one of the first sense electrodes and adjacent to one of the second sense electrodes and a second proof mass, wherein the second proof mass is located adjacent to another of the first sense electrodes, and to another of the second sense electrodes. The system may further comprise processing circuitry coupled to receive a first capacitance signal from the first proof mass and the second capacitance signal from the second proof mass, to identify a common mode signal for the capacitance signals, and to identify the capacitor error based on the common mode signal.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
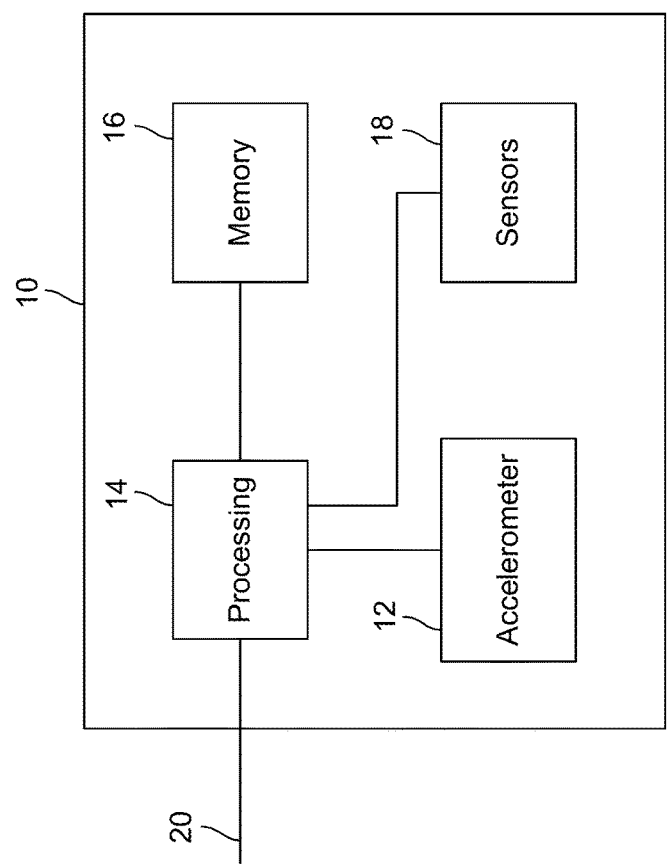
FIG. 1 shows an illustrative motion sensing system in accordance with an embodiment of the present disclosure.

An accelerometer is designed and manufactured as a microelectromechanical (MEMS) accelerometer. A MEMS layer is formed using semiconductor processing techniques to include the mechanical components of the sensor and electrical connections to other components of the MEMS accelerometer, such as CMOS circuitry located within the sensor die (e.g., a CMOS layer that also functions as a substrate or cap layer) or external to the sensor die. The MEMS layer is hermetically sealed within other semiconductor layers, such as an underlying substrate layer and a cap layer.

The MEMS layer includes a suspended spring-mass system in which one or more proof masses are suspended within the MEMS layers by springs. The movement of the proof masses is restricted by the springs, and in some embodiments, additional components such as masses and levers. These springs and additional components collectively facilitate the motion of the proof masses along one or more axes that are used for sensing linear acceleration. Sense electrodes are located adjacent to each proof mass in the direction of the sensed linear acceleration, forming a capacitor that changes based on the distance between the proof masses and sense electrodes.

The adjacent portions of the proof mass and sense electrodes may be designed in a number of different configurations to facilitate capacitive sense of the movement of the proof mass relative to the sense electrodes. In some embodiments, the proof masses and sense electrodes may have parallel faces that function as capacitive plates, such that movement of a proof mass towards or away from a sense electrode (e.g., perpendicular to the parallel face of the proof mass) results in a change in capacitance. Although additional other configurations may be utilized, another exemplary configuration may include interdigitated sense combs. Each of the proof mass and the sense electrode may have a number of fingers that extend from the face of the proof mass and sense electrode. In response to movement of the proof mass due to linear acceleration (e.g., in a direction parallel to the face of the proof mass), the distance between the interdigitated sense combs will change, thus changing the overall capacitance between the proof mass and the sense electrode.

A MEMS accelerometer may include multiple proof masses and sense electrodes that are associated for purposes of sensing linear acceleration. Each proof mass may respond in a similar manner to linear acceleration, resulting in a similar change in location with respect to its respective sense electrode. A sense drive signal having a sense drive frequency may be provided to each capacitor (e.g., each proof mass/sense electrode pair) via one of the proof mass or sense electrode. In some embodiments, the sense drive signals that are applied to the capacitor may be differential signals, such that the sense signal at each capacitor is 180° out of phase. The differential signals that are output by the capacitors may be converted to a sense signal having a voltage that is based on the change in capacitance and linear acceleration, by conversion circuitry such as a capacitance to voltage (C2V) converter.

Under normal operating conditions, the signals that are output from the capacitors should substantially cancel each other with respect to any common mode signal components. Because the sense drive signals are differential and because the proof masses are designed to respond in a similar manner to linear acceleration, the capacitance signals that are output from the respective capacitors (e.g., from a proof mass or sense electrode) should also be almost exclusively differential signals both as to phase and magnitude. However, if one of the capacitors is damaged (e.g., as a result of a misaligned or damaged proof mass or sense electrode, damaged sense combs, etc.), the capacitance signal that is output from the damaged capacitor may change in phase or amplitude from designed response, resulting in common mode components between the capacitance signals.

Common mode test circuitry may monitor the capacitance signals to determine whether a common mode component of the capacitance signals exceeds one or more thresholds. In an embodiment, the common mode test circuitry may include a common mode input circuit, an amplifier circuit, and a comparison and testing circuit. The common mode input circuit and amplifier circuit may receive and filter the capacitance signals to generate a common mode signal representative of common mode components between the received capacitance signals. The common mode signal may be compared to one or more common mode signals (e.g., based on one or more thresholds). Based on the comparison, it may be determined whether it is possible to compensate for the change in capacitance associated with the common mode signal, for example, by modifying scaling factors or sense drive signals. If compensation is not possible, the accelerometer may cease operation.

FIG. 1 depicts an exemplary motion sensing system 10 in accordance with some embodiments of the present disclosure. Although particular components are depicted in FIG. 1, it will be understood that any suitable combination of sensors, processing components, memory, and other circuitry may be utilized as necessary for different applications and systems. In an embodiment as described herein, the motion sensing system may include at least a MEMS accelerometer 12 and supporting circuitry, such as processing circuitry 14 and memory 16. In some embodiments, one or more additional sensors 18 (e.g., additional MEMS gyroscopes, MEMS accelerometers, MEMS microphones, MEMS pressure sensors, and a compass) may be included within the motion processing system 10 to provide an integrated motion processing unit ("MPU") (e.g., including 3 axes of MEMS gyroscope sensing, 3 axes of MEMS accelerometer sensing, microphone, pressure sensor, and compass).

Processing circuitry 14 may include one or more components providing necessary processing based on the requirements of the motion processing system 10. In some embodiments, processing circuitry 14 may include hardware control logic that may be integrated within a chip of a sensor (e.g., on a substrate or cap of an accelerometer 12 or other sensor 18, or on an adjacent portion of a chip to the accelerometer 12 or other sensor 18) to control the operation of the accelerometer 12 or other sensors 18 and perform aspects of processing for the accelerometer 12 or other sensors 18. In some embodiments, the accelerometer 12 and other sensors 18 may include one or more registers that allow aspects of the operation of hardware control logic to be modified (e.g., by modifying a value of a register). In some embodiments, processing circuitry 14 may also include a processor such as a microprocessor that executes software instructions, e.g., that are stored in memory 16. The microprocessor may control the operation of the accelerometer 12 by interacting with the hardware control logic, and process measurement signals received from accelerometer 12. The microprocessor may interact with other sensors 18 in a similar manner.

Although in some embodiments (not depicted in FIG. 1), the accelerometer 12 or other sensors 18 may communicate directly with external circuitry (e.g., via a serial bus or direct connection to sensor outputs and control inputs), in an embodiment the processing circuitry 14 may process data received from the accelerometer 12 and other sensors 18 and communicate with external components via a communication interface 20 (e.g., a SPI or I2C bus, or in automotive applications, a controller area network (CAN) or Local Interconnect Network (LIN) bus). The processing circuitry 14 may convert signals received from the accelerometer 12 and other sensors 18 into appropriate measurement units (e.g., based on settings provided by other computing units communicating over the communication bus 20) and perform more complex processing to determine measurements such as orientation or Euler angles, and in some embodiments, to determine from sensor data whether a particular activity (e.g., walking, running, braking, skidding, rolling, etc.) is taking place.

In some embodiments, certain types of information may be determined based on data from multiple accelerometers 12 and sensors 18, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

An exemplary MEMS accelerometer (e.g., accelerometer 12) may include one or more movable proof masses that are configured in a manner that permits the MEMS accelerometer to measure linear acceleration along an axis. In some embodiments, the one or more movable proof masses may be suspended from anchoring points, which may refer to any portion of the MEMS sensor which is fixed, such as an anchor that extends from a layer (e.g., a CMOS layer) that is parallel to the MEMS layer of the device, a frame of the MEMS layer of the device, or any other suitable portion of the MEMS device that is fixed relative to the movable proof masses. The proof masses may be arranged in a manner such that they move in response to linear acceleration. The movement of the proof masses relative to a fixed surface (e.g., a fixed sense electrode) in response to linear acceleration is measured and scaled to determine linear acceleration or some other motion parameter.

The proof masses and the sense electrodes may form capacitors, the capacitance of which changes based on the movement of the proof masses relative to the sense electrodes. Sense drive signals having a sense drive frequency may be applied to each capacitor via one of a proof mass or sense electrode, and linear acceleration may be sensed based on analysis of output capacitance signals at the sense drive frequency. In some embodiments, capacitors may be associated with each other such that differential sense drive signals (e.g., having the same sense drive signal 180° out of phase) are applied to each of the capacitors. The capacitance signals output from each of the capacitors may also be differential signals, and a sense signal having a differential voltage that is representative of linear acceleration may be determined based on the capacitance signals.

In some instances, a capacitor may be defective (e.g., due to a manufacturing error) or damaged during operation, for example, based on misalignment of a proof mass and sense electrode or physical damage to components such as sense combs. The capacitance signal that is provided by the damaged capacitor may no longer correspond to a designed response, such that an acceleration determined based on this capacitance signal may not be accurate. In some embodiments, the capacitance signals from associated capacitors may be measured and filtered in order to determine a common mode component of the capacitance signals. This common mode component may be very small in normal circumstances, and may increase when a damaged capacitor alters the balanced differential design of the associated capacitors. If the common mode component exceeds certain thresholds, the operation of the accelerometer may be modified or the accelerometer may cease operation.

Figure 2:
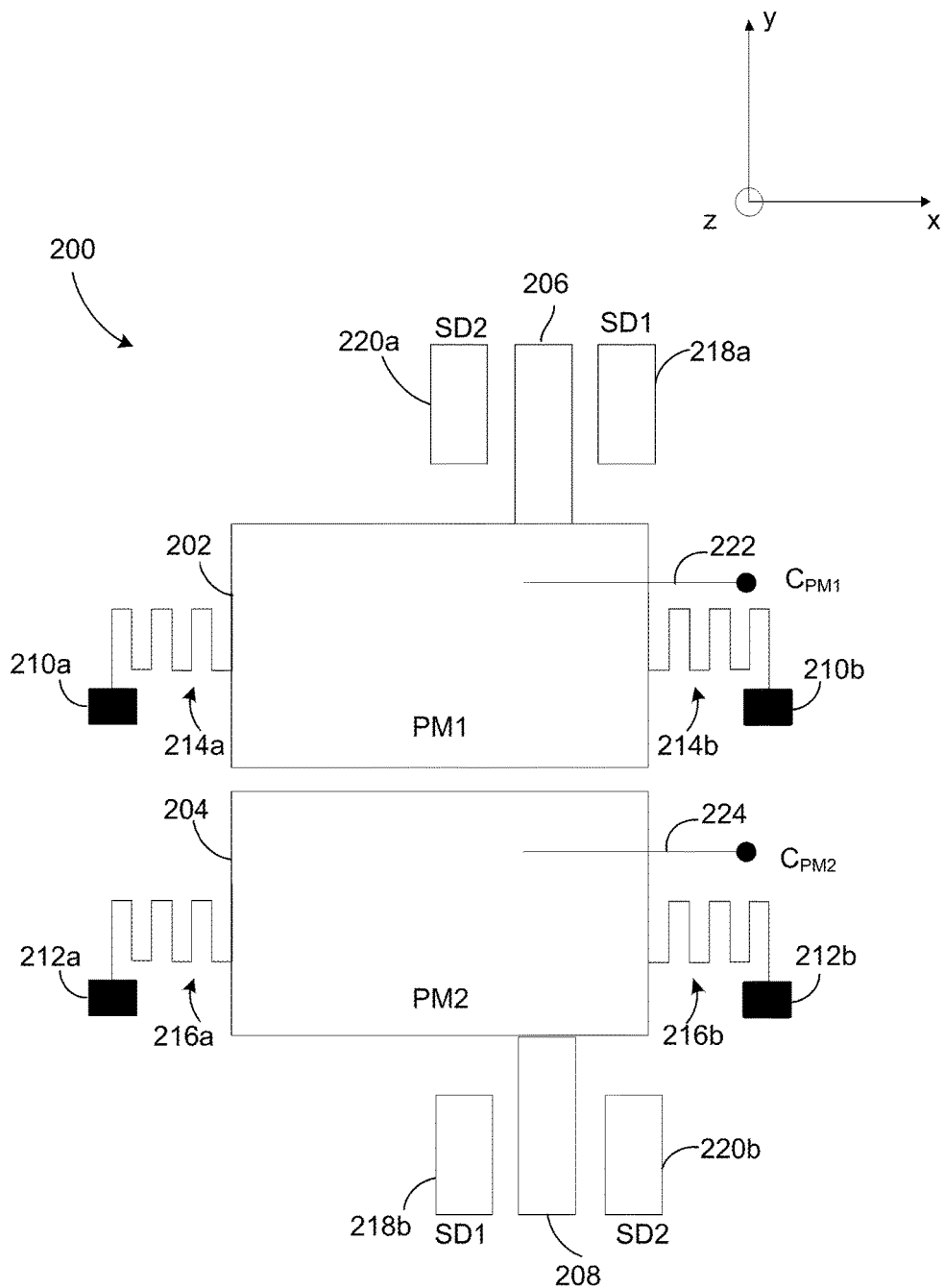
FIG. 2 shows an illustrative accelerometer in accordance with some embodiments of the present disclosure.

FIG. 2 depicts an illustrative accelerometer with common mode testing in accordance with some embodiments of the present disclosure. As depicted in FIG. 2, an exemplary accelerometer comprises a suspended spring mass system a plurality of sense electrodes, and a plurality of sense paths for capacitance signals. Although an exemplary accelerometer 200 is depicted as including particular components in FIG. 2, it will be understood that the present disclosure may be implemented with a variety of suitable accelerometer designs including any suitable number and configuration of proof masses, springs, coupling masses, levers, coupling arms, electrodes, and other suitable components that enable the sensing of linear acceleration in one or more directions.

In an embodiment, the accelerometer includes proof mass 202 and proof mass 204 in a MEMS layer of the accelerometer, which are suspended from a plurality of anchors 210a/210b and 212a/212b via respective springs 214a/214b and 216a/216b. The exemplary anchors 210a/210b and 212a/212b extend from a substrate (e.g., located below the MEMS layer in the negative z-direction) into the MEMS layer, such that the springs 214a/214b and 216a/216b within the MEMS layer facilitate the suspension of the proof masses 202 and 204. In an embodiment, springs 214a/214b and 216a/216b are folded springs that are constructed and located such that they are compliant along a first axis within the MEMS plane of the accelerometer 200 and rigid along a second axis within the MEMS plane. In the exemplary embodiment of FIG. 2, the accelerometer 200 may sense linear acceleration along the x-axis, and the springs 214a/214b and 216a/216b may be compliant along the x-axis and rigid along the y-axis.

The accelerometer may include components to sense the movement of the proof masses 202 and 204 in response to linear acceleration, which may include any suitable sensing mechanisms such as optical sensing, piezoelectric sensing, capacitive sensing, or any other suitable sensing techniques. In an embodiment, sensing may be performed based on the movement of the proof masses 202 and 204 with respect to fixed sense electrodes. Although depicted as forming capacitive plates in FIG. 2, in embodiments the proof masses and sense electrodes may include other suitable sensing components such as drive combs form a capacitor having a capacitance that varies based on the distance between a respective proof mass and fixed sense electrode.

In an embodiment, a first proof mass arm 206 may extend from proof mass 202 in the positive y-direction and a second proof mass arm 208 may extend from proof mass 204 in the negative y-direction, such that the each of the proof mass arms may form an exposed surface (e.g., having the depth of the MEMS layer in the z-direction) facing in the direction of the axis along which linear acceleration is being sensed (e.g., facing in each of the positive x-direction and negative x-direction). As depicted in FIG. 2, in an exemplary embodiment each of a plurality of sense electrodes may be located adjacent to the proof mass arms 206/208 of the proof masses 202/204. In the context of the present disclosure, it will be understood that a description of an electrode or similar sensing component as "adjacent" to a proof mass includes a proof mass or any components thereof, or any other components that move proportionally and in unison with the proof mass.

In the embodiment of FIG. 2, each of sense electrodes 218a, 218b, 220a, and 220b extend from the substrate into the MEMS layer, such that each proof mass includes a surface that faces a plane of one of the proof mass arms 206/208 along the axis of sensed linear acceleration of the accelerometer (e.g., a surface of sense electrode 220a facing a surface of proof mass 206 in the positive x-direction, a surface of sense electrode 218a facing a surface of proof mass 206 in the negative x-direction, a surface of sense electrode 218b facing a surface of proof mass 208 in the positive x-direction, and a surface of sense electrode 220b facing a surface of proof mass 208 in the negative x-direction). In this manner, sense electrodes 220a and 218a each form a capacitor with proof mass arm 206 that changes capacitance based on the movement of the proof mass arm 206 relative to the fixed sense electrodes 220a/218a, while sense electrodes 218b and 220b each form a capacitor with proof mass arm 208 that changes capacitance based on the movement of the proof mass arm 208 relative to the fixed sense electrodes 218b/220b.

In some embodiments, a periodic signal may be applied to sense electrodes and/or proof masses in order to sense a linear acceleration along the sensing axis. The periodic signal may be a sense drive signal that is applied and is sensed as having a substantially constant magnitude when the proof mass is not moving (i.e., when there is no linear acceleration). In response to a linear acceleration along the sensing axis the proof mass may move, such that the magnitude of the oscillation relative to the fixed sense electrodes changes in a manner that is proportional to the magnitude of the linear acceleration.

In an embodiment of the exemplary accelerometer of FIG. 2, a differential sense drive signal may be applied to the respective sense electrodes for a particular proof mass, although it will be understood that in some embodiments a common mode drive signal may be utilized. As depicted in FIG. 2, a label SD1 is associated with each of sense electrodes 218a and 218b and a label SD2 is associated with each of sense electrodes 220a and 220b. In an embodiment, each of the labels correspond to differential sense drive signals SD1 and SD2 having a common sense drive frequency but being 180° out of phase. In this manner, the first sense drive signal SD1 is applied to proof mass 202 via the capacitor formed by sense electrode 218a and proof mass arm 206, the second sense drive signal SD2 is applied to proof mass 202 via the capacitor formed by sense electrode 220a and proof mass arm 206, the first sense drive signal SD1 is applied to proof mass 204 via the capacitor formed by sense electrode 218b and proof mass arm 208, and the second sense drive signal SD2 is applied to proof mass 204 via the capacitor formed by sense electrode 220b and proof mass arm 208. In the exemplary embodiment of FIG. 2, this configuration and application of sense drive signals is suitable for the configuration in which the proof masses 202 and 204 moving in response to a linear acceleration along the sense axis, such that the relative position and capacitance between proof mass 202 and sense electrode 218a is equal to the relative position and capacitance between proof mass 204 and sense electrode 220b, and such that the relative position and capacitance between proof mass 202 and sense electrode 220a is equal to the relative position and capacitance between proof mass 204 and sense electrode 218b.

Although it will be understood that the response of the proof masses to a linear acceleration may be measured based on a variety of suitable techniques from a variety of sense mechanisms (e.g., measurement of signals from sense electrodes, etc.), in an embodiment, the movement of the proof mass relative to the sense electrodes may be measured based on capacitance signals output $C_{PM1}$ and $C_{PM2}$ that are output from proof mass 202 (PM1) and proof mass 204 (PM2), respectively. These signals representative of changes in capacitance (e.g., voltages, currents, etc.) may be measured via a sense path 222 for proof mass 202 and sense path 224 for proof mass 224. Although the sense path is depicted as a direct connection in FIG. 2, it will be understood that a sense path may include any suitable components or combination thereof that form an electrical path between the component being sensed (e.g., proof masses 202 and 204) and sensing circuitry that generate a signal responsive to the movement of the proof mass relative to the sense electrodes. In exemplary embodiments, a sense path may include one or more components within the MEMS layer (e.g., proof masses, springs, coupling masses, levers, etc.), other layers of the MEMS die (e.g., anchors, electrical traces, wires, etc.) and other components coupled to the accelerometer die (e.g., wires or leads connected to external sensing circuitry). In some embodiments (not depicted in FIG. 2), the sense path may be provided from a sense electrode rather than the proof mass. Although the present disclosure may generally describe embodiments in which capacitance signals are output via a sense path coupled to proof masses, it will be understood that in some embodiments and accelerometer configurations the capacitance signals may be provided via sense paths coupled to sense electrodes.

The capacitance signal outputs $C_{PM1}$ and $C_{PM2}$ may be differential signals at the sense drive frequency based on the differential sense drive signals that are applied via the sense electrodes 218a/218b/220a/220b. In some embodiments such as the balanced design with differential sense drive signals of FIG. 2, the capacitance signals output from $C_{PM1}$ and $C_{PM2}$ may have a minimal common mode signal, based on the cancellation and additive effects of the differential sense drive signals and similar movement of the proof masses 202 and 204 in response to linear acceleration along the sense axis. In an embodiment where one or more of the proof masses or sense electrodes is misaligned or damaged, one of the capacitance signals may change from its designed response to linear acceleration. For example, damage to one or more of proof mass arm 206, sense electrode 218a, or sense electrode 220a may reduce the area of the capacitors formed with proof mass 202. Misalignment or improper positioning of the proof mass arm 206, sense electrode 218a, and sense electrode 220a may result in a change in the value of the capacitor, as any movement due to linear acceleration will be with respect to a different initial capacitor configuration. This will result in a change from an expected capacitance signal $C_{PM1}$ in response to linear acceleration. In a similar manner, damage, misalignment, or improper positioning may also occur with respect to proof mass arm, sense electrode 218b, or sense electrode 220b, resulting in a change from an expected capacitance signal $C_{PM2}$ in response to linear acceleration.

Figure 3:
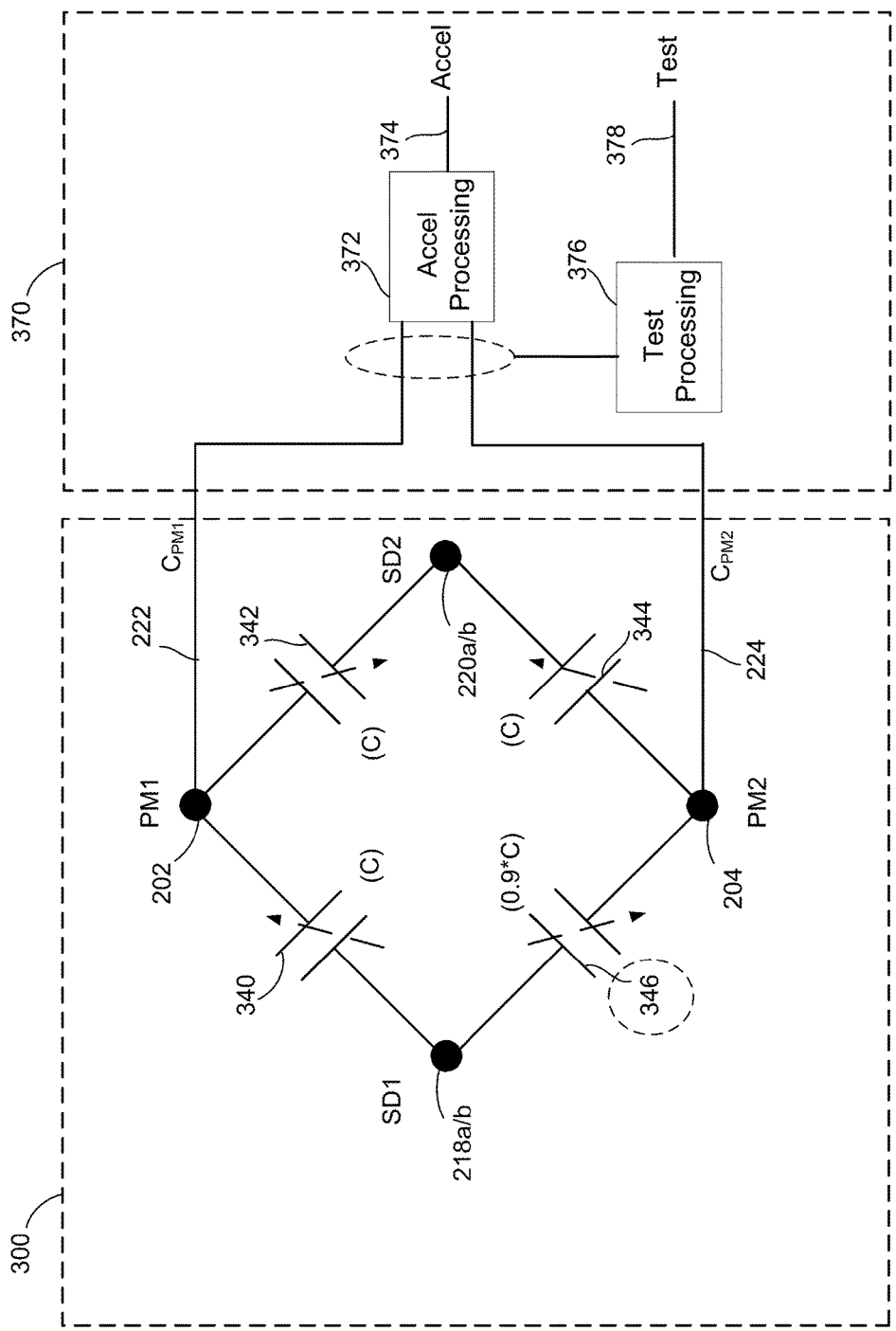
FIG. 3 shows an illustrative schematic diagram of the accelerometer of FIG. 2 in accordance with some embodiments of the present disclosure.

FIG. 3 provides an exemplary schematic depiction of the accelerometer of FIG. 2 coupled to processing circuitry in accordance with some embodiments of the present disclosure. In the schematic depiction of the FIG. 3, the numbering of the proof masses sense electrodes, sense paths, and capacitance signals corresponds to the numbering FIG. 2, with these physical elements indicated by circular nodes in FIG. 3. Proof masses 202 and 204 correspond to the nodes 202 and 204, sense electrodes 218a and 218b correspond to node 218a/b, sense electrodes 220a and 220b correspond to node 220a/b, sense paths 222 and 224 correspond to sense paths 222 and 224, and the capacitance signals are labeled $C_{PM1}$ and $C_{PM2}$. As is depicted in FIG. 3, the sense electrodes 218a/b and 220a/b are each depicted as a single node, as each pair 218a/b and 220a/b provides a respective sense drive signal SD1 or SD2.

The capacitors formed by the proof masses and the sense electrodes are depicted as capacitor 340 (e.g., between proof mass 202 and sense electrode 218a), capacitor 342 (e.g., between proof mass 202 and sense electrode 220a), capacitor 344 (e.g., between proof mass 204 and sense electrode 220b), and capacitor 346 (e.g., between proof mass 204 and sense electrode 218b). In the embodiment of FIGS. 2 and 3, the capacitance of capacitors 340, 342, 344 and 346 will change in response to linear acceleration along the sense axis.

Each of the capacitors may charge and discharge based on the capacitance of the capacitor and the signals that are applied to each of the capacitors (e.g. signals SD1 and SD2). These changes in charge include periodic components based on the frequencies of the applied sense drive signal. In an embodiment where there is linear acceleration along the positive x-axis of FIG. 2, proof mass 202 moves towards sense electrode 220a and proof mass 204 moves towards sense electrode 218b. At the same time, proof mass 202 moves away from sense electrode 218a and proof mass 204 moves away from sense electrode 220b. In a similar manner, a linear acceleration along the negative x-axis will cause proof mass 202 to move towards sense electrode 218a and away from sense electrode 220a, and will cause proof mass 204 to move towards sense electrode 220b and away from sense electrode 218b. When a proof mass and sense electrode move closer to each other, the capacitance of the capacitor formed thereby will increase. When a proof mass and sense electrode move farther away from each other, the capacitance of the capacitor formed thereby will decrease. The arrows in FIG. 3 depict a response to linear acceleration along the negative x-axis, in which the capacitance of capacitor 340 formed by proof mass 202 and sense electrode 218a increases, the capacitance of capacitor 342 formed by proof mass 202 and sense electrode 220a decreases, the capacitance of capacitor 344 formed by proof mass 204 and sense electrode 220b increases, and the capacitance of capacitor 346 formed by proof mass 204 and sense electrode 218b decreases.

In an exemplary embodiment of FIGS. 2 and 3 described and depicted herein, differential sense drive signals are applied at respective sense electrodes 218a/218b and 220a/220b. The changes in capacitance are sensed at the proof masses 202 and 204 based on these differential signals, and capacitance signals $C_{PM1}$ and $C_{PM2}$ are provided to acceleration processing circuitry 372 (e.g., of processing circuitry 14) and test circuitry 376 (e.g., of processing circuitry 14) via sense path 222 and sense path 224.

As described herein, the underlying capacitive characteristics of each individual capacitor may vary based on a variance of one of the components of the capacitor (e.g., a proof mass or sense electrode), for example, as a result of a manufacturing defect, damage, misalignment, or improper positioning. FIG. 3 depicts a change in capacitance for each of the capacitors 340, 342, 344, and 346 in response to the movement of the proof masses due to linear acceleration. This is depicted as a change in capacitance in parentheses next to the associated capacitor as result of the movement of the proof masses. For the exemplary embodiment of FIG. 3, the movement of the proof mass 202 towards sense electrode 218a causes a positive change in capacitance, the movement of the proof mass 202 away from sense electrode 220a causes a negative change in capacitance, the movement of the proof mass 204 towards sense electrode 220b causes a positive change in capacitance, and the movement of the proof mass 204 away from sense electrode 218b causes a negative change in capacitance.

In the exemplary embodiment of FIG. 3, one of the components of capacitor 346 (e.g., proof mass 204 or 218b) varies from a desired or designed configuration (e.g., as a result of a manufacturing defect, damage, misalignment, or improper positioning) such that the capacitive characteristics of capacitor 346 differs from the other capacitors 340, 342, and 344. While the capacitance of each of the capacitors 340, 342, and 344 is relatively uniform, the capacitance of capacitor 346 differs in a substantial manner due to the variance in capacitive characteristics. In a similar manner, the capacitance change due to linear acceleration will be similar for capacitors 340, 342, and 344 (e.g., by a positive or negative change in capacitance $\Delta C$), but will differ for capacitor 346 based on its changed capacitive characteristics (e.g., to have a value that differs from $\Delta C$). In the exemplary embodiment of FIG. 3, the capacitor 346 has a value 0.9*C while all of the other capacitors have a value of C. In a similar manner, the same linear acceleration results in a different change in capacitance (e.g., of $-0.9\Delta C$ or $+0.9\Delta C$ for x-axis linear acceleration) for capacitor 346. For example, in the embodiment of FIG. 3, the change in capacitance may be $+\Delta C$ for capacitor 340, $-\Delta C$ for capacitor 342, $+\Delta C$ for capacitor 344, and $-0.9*\Delta C$ for capacitor 346, The capacitance signals $C_{PM1}$ and $C_{PM2}$ from the accelerometer 300 may be provided to the acceleration processing circuitry 372 and test circuitry 376 via the sense paths 222 and 224. In an embodiment the acceleration processing circuitry may measure the sensed acceleration based on the capacitance signals $C_{PM1}$ and $C_{PM2}$ using conversion circuitry ((e.g., a capacitance to voltage conversion circuit) that outputs a sensed signal having an electrical output (e.g., a voltage or current) that is based on the capacitance signals $C_{PM1}$ and $C_{PM2}$ (e.g., is proportional to a differential between the capacitances). The acceleration processing circuitry may perform other operations such as filters, analog-to-digital conversion, scaling, comparison to thresholds, signal analysis, and generation of alarms and notifications. In an exemplary embodiment, the acceleration signal 374 may be any suitable signal that may be used to determine acceleration (e.g. a portion of the sensed signal at the sense drive frequency, a signal that is directly proportional to the physical movement of the proof mass, etc.), an acceleration measurement (e.g., an acceleration value), or a representation thereof (e.g., notifications, alarms, etc.).

Under normal conditions when all of the capacitors have similar capacitive characteristics, the capacitance signals $C_{PM1}$ and $C_{PM2}$ will be differential signals at the sense drive frequency, such that any net common mode signal may substantially cancel (e.g., with a minimal expected common mode component based on component and manufacturing tolerances). However, when one of the capacitors varies in a manner that exceeds tolerances, a net common mode component will be seen between the capacitance signals, based on the differences in the capacitance value for the anomalous capacitor (e.g., in FIG. 3, capacitor 346).

Test circuitry 376 may be coupled to the sense paths 222 and 224 to receive the capacitance signals $C_{PM1}$ and $C_{PM2}$ and to identify the presence of an anomalous capacitance based on the capacitance signals. As described herein, the test circuitry 376 may utilize a common mode signal to determine whether the accelerometer includes a capacitor error, for example, by extracting and filtering the received capacitance signals to output a common mode signal that is compared to one or more thresholds. If the common mode signal exceeds a threshold, it may be determined that one of the capacitors is anomalous. In some embodiments, the capacitor error may be identified. Compensation may also be performed based on the capacitor error and the degree to which the common mode signal exceeds the threshold (or, in some embodiments, which of a plurality of thresholds are exceeded by the common mode signal). For example, processing may adjust scaling factors applied to a received acceleration signal by the acceleration processing circuitry 372, filtering may reduce a common mode component of the received signal, or the applied sense drive signals may be modified. If compensation may not be performed, notifications or warnings may be provided to cause the accelerometer to cease operating. The test circuitry 376 may output a test signal 378, which may include an analog signal, digital signal, data signal, or any suitable combination thereof, that provides information about the common mode signal, capacitor error, compensation, errors, notifications, or any suitable combination thereof.

Figure 4:
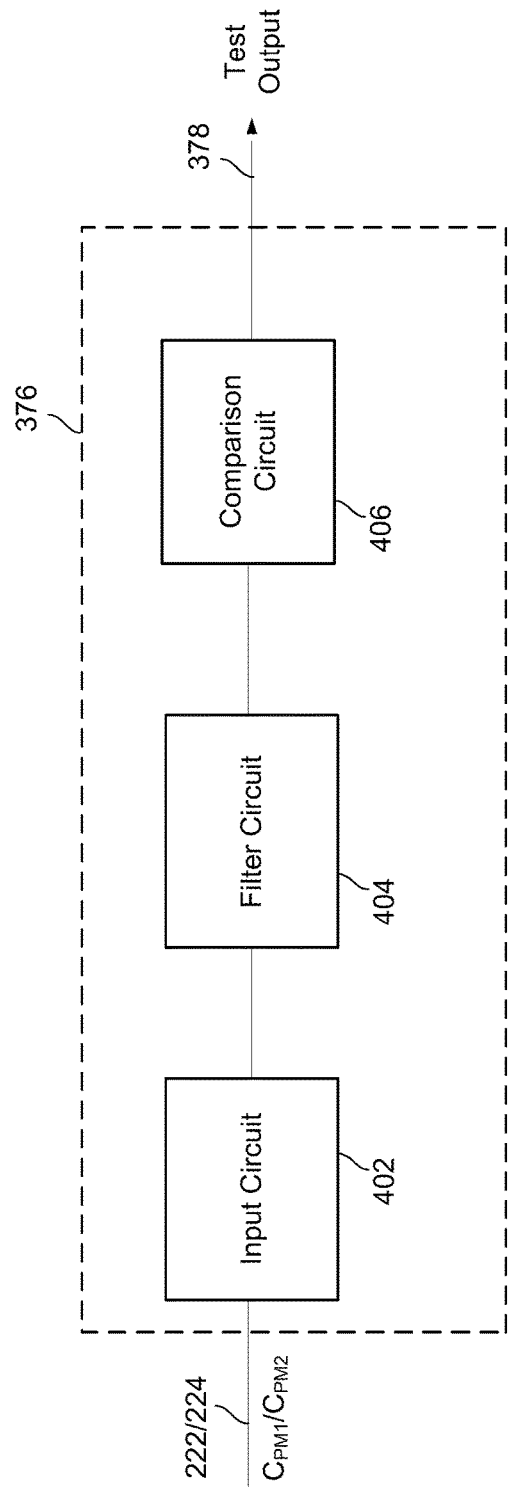
FIG. 4 shows an illustrative schematic diagram of an exemplary common mode test circuit in accordance with some embodiments of the present disclosure.

FIG. 4 shows an illustrative block diagram of test circuitry 376 of processing circuitry 14 in accordance with some embodiments of the present disclosure. Although it will be understood that a variety of circuits may be employed for test circuitry 376, that the functionality of the circuitry thereof may be modified, and that certain circuitry may be removed or reordered, in an embodiment the test circuitry 376 may include an input circuit 402, filter and amplifier circuit 404, and a comparison circuit 406.

Input circuit 402 may receive one or more signals from the sense paths 222/224 and provide a raw common mode signal to additional circuitry of test circuitry 376. In some embodiments, each of the signals received via the sense paths 222/224 may undergo processing prior to being provided to the input circuit 402, for example, to amplify or filter capacitance signals output from the proof masses or sense electrodes. In an embodiment, capacitance signals $C_{PM1}$ and $C_{PM2}$ may be provided directly to input circuit 402. Input circuit may include circuitry and components that are configured to output a signal that is representative of a common mode between the capacitance signals $C_{PM1}$ and $C_{PM2}$. In an embodiment, the input circuit may include circuitry that causes an increase in current and voltage when a common mode signal component exists between the capacitance signals $C_{PM1}$ and $C_{PM2}$. This raw common mode signal may be output to filter and amplifier circuit 404.

Filter and amplifier circuit 404 may receive the raw common mode signal from circuitry such as input circuit 402, and may apply filtering to the raw common mode signal to output a common mode signal that may be used for further analysis of whether a capacitor error exists within the accelerometer. Although different raw common mode signals (e.g., capacitance signals, filtered capacitance signals, digitized capacitance signals, combined capacitance signals, etc.) may be filtered in a variety of manners (e.g., RC filtering, amplification, pass-band filtering, etc.) to provide a variety of common mode signals (e.g., an analog or digital signal representing the magnitude of the common mode component of the capacitance signals), in an embodiment the raw common mode signal may be a periodic signal at the sense drive frequency, with a magnitude that changes based on the common mode component of the capacitance signals received at the input circuit 402. The filter circuit may amplify and RC filter the circuit to output a common mode signal that is representative (e.g., proportional) to the magnitude of the common mode component of the capacitance signals. In an embodiment, the common mode signal may be a non-periodic signal (e.g., an analog voltage) having a value that changes in proportion to the overall common mode component due to the asymmetry due to capacitor 346.

The common mode signal may be provided to the comparison circuit 406, which may determine whether the accelerometer includes a capacitor error based on the received common mode signal. Although the comparison may be performed based on a number of suitable signal analysis techniques, in an embodiment the comparison may be based on comparison of the received common mode signal to one or more thresholds. In an embodiment, exemplary thresholds may be based on accepted tolerances for the components of the capacitors (e.g., proof masses and sense electrodes) and resulting changes in capacitance as a result of a full tolerance stack-up of components. In some embodiments, an additional error factor may be applied to the threshold such that a limited amount of common mode error greater than the tolerance may be allowed. In some embodiments, a plurality of thresholds may be employed that result in different actions by the accelerometer, such as a notification that a common mode error is likely to occur, initiation of a variety of compensation techniques, generation of warnings and error messages, and causing the accelerometer to cease operation. The comparison circuit 406 may perform some or all of this processing, or in some embodiments, may provide comparison results (e.g., "1" and "0" values based on comparisons of the common mode signal to thresholds) to other circuitry of processing circuitry 14 for further processing. The output of the comparison circuit 406 may be a test output that may include comparison results and/or other information as described herein (e.g., notifications, error messages, control signals for compensation, etc.).

Figure 5:
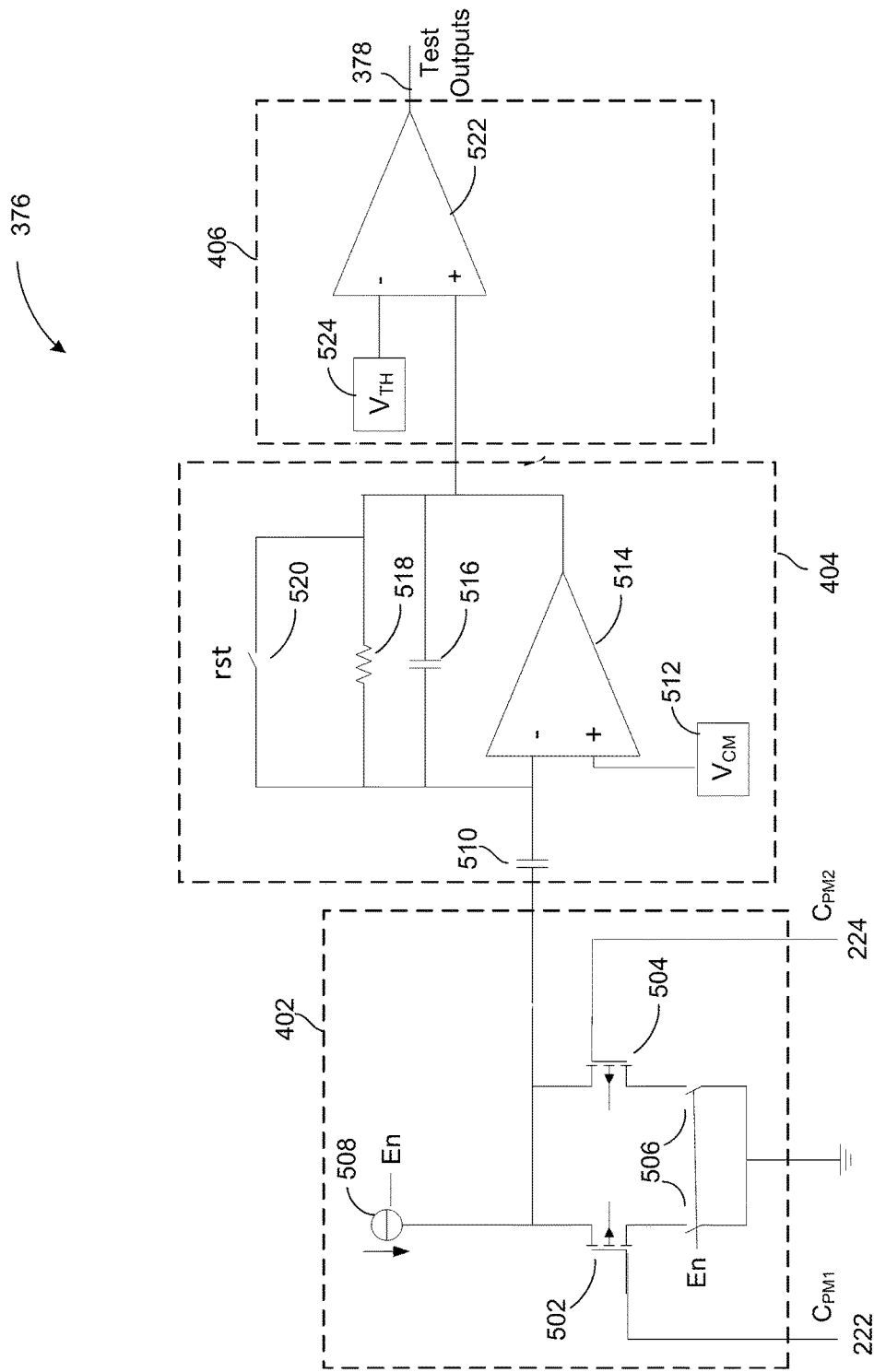
FIG. 5 shows an illustrative circuit diagram of an exemplary common mode test circuit in accordance with some embodiments of the present disclosure.

FIG. 5 shows an illustrative circuit diagram of test circuitry 376 in accordance with some embodiments of the present disclosure. In an embodiment, the circuit diagram may depict components of the input circuit 402, filter and amplifier circuit 404, and comparison circuit 406, although it will be understood that in other embodiments other circuits may be employed, the components depicted may be rearranged, one or more components may be added or removed, and one or more of the components may be replaced by other components performing similar functionality.

In an exemplary embodiment of input circuit 402, the capacitance signals $C_{PM1}$ and $_{CPM2}$ may be provided to the input circuit 402 via sense paths 222 and 224, and a raw common mode signal may be output from the input circuit 402 (e.g., to filter and amplifier circuit 404). Although the input circuit 402 may include any suitable components to perform this functionality, in an embodiment the input circuit 402 may include current source 508, first input transistor 502, second input transistor 504, and enable switches 506.

In an embodiment, the operation of the test circuitry 376 may be enabled or disabled based on an enable signal. Although an enable signal may be provided in any suitable manner, in an embodiment the enable signal may be provided to current source 508 and to enable switches 506. When the enable signal is "on," the current source 508 may provide a current to the other components of the input circuit 402. In an embodiment, a current provided by the current source may be sufficient to allow a voltage to build up on capacitor 510 under conditions where a common mode component exists between the capacitance signals. In an embodiment, the enable signal may also be provided to enable switches 506. Each enable switch may be connected between one the first transistor 502 and ground or the second transistor 504 and ground. When the enable signal is "on," the enable switches 506 close to create an electrical connection between the first transistor 502 and ground and the second transistor 504 and ground.

When the enable signal is "on," the input circuit 402 may provide the raw common mode signal in response to received capacitance signals. In an embodiment, capacitance signal $C_{PM1}$ may be provided to first input transistor 502 via sense path 222 and capacitance signal $C_{PM2}$ may be provided to second input transistor 504 via sense path 224. As will be described herein, the components of input circuit 402 may be configured such that a voltage will be output as the raw common mode signal when a common mode component exists between the capacitance signal $C_{PM1}$ and the capacitance signal $C_{PM2}$. In different embodiments, this may be performed with a variety of components including multiple interconnected transistors, capacitors, resistors, diodes, etc.

In the exemplary embodiment of FIG. 5, each of the capacitance signals may be input to the gate of a p-channel enhancement type MOSFET (e.g., of first transistor 502 and second transistor 504). The first transistor 502 and second transistor 504 may be coupled in parallel between a first node and a second node, with the first node connected to the current source 508 and capacitor 510, and the second node connected to ground. Under normal operating conditions (e.g., when the capacitor characteristics are all within tolerance), the signals provided to the first transistor 502 and the second transistor 504 should be almost exclusively differential signals.

In an embodiment, first transistor 502 second transistor 504 may have a large overdrive and may function as a differential pair, such that when the input signals $C_{PM1}$ and $C_{PM2}$ are differential signals (e.g., the capacitances of the accelerometer are equal and a differential sense signal is applied to the accelerometer), the sources of p-channel MOSFET (e.g., a common source configuration) are at the same voltage. At times when the input signals to the differential pair have a common mode (e.g., when $C_{PM1}$ is equal to $C_{PM2}$) the differential pair functions as voltage follower. The voltage of $C_{PM1}=C_{PM2}$ is propagated to the common source with a threshold voltage.

In an exemplary embodiment of filter and amplifier circuit 404, the raw common mode signal may be provided to the filter and amplifier circuit 404 from input circuit 402 such that filter and amplifier circuit 404 may output a filtered common mode signal (e.g., to comparison circuit 406). Although the filter and amplifier circuit 404 may include any suitable components to perform this functionality, in an embodiment the filter and amplifier circuit 404 may include capacitor 510, voltage input 512, amplifier 514, capacitor 516, resistor 518, and reset switch 520.

In an embodiment, the raw common mode signal may be provided to capacitor 510 and from capacitor 510 to a first input of the amplifier 514, while the voltage input 512 $V_{CM}$ may be a suitable voltage that is provided to the other input of the amplifier. The output of amplifier 514 may be coupled to the input to amplifier 514 via parallel feedback capacitor 516 and feedback resistor 518. In an embodiment, capacitors 510 and 516, and resistor 518, may be sized such that the output common mode signal from amplifier 514 has desirable characteristics such as removal of AC components from the raw common mode signal (e.g., to output an analog voltage that is substantially fixed in response to a fixed magnitude common mode component of the capacitance signals) and providing an appropriate dynamic range to accommodate expected common mode magnitudes. The capacitance 510 works as ac coupling. The signal on the common source may be amplified by the ratio of capacitance 510 and capacitance 516. Resistor 518 may retain a DC feedback on the amplifier 514. In an embodiment, a reset switch 520 may also be provided in parallel to the resistor 518, capacitor 516, and amplifier 514, to selectively short these components, (e.g., during start-up to set the voltage of the negative input of the amplifier).

The common mode signal that is output from the filter and amplifier circuit 404 may be provided to the comparison circuit 406. As described herein, the comparison circuit may perform suitable comparison or comparisons of a signal representing the common mode component (e.g., the common mode signal) to generate a variety of test outputs in different embodiments. In an embodiment depicted in FIG. 5, comparison circuit may comprise a comparator 522 and a comparator threshold voltage 524.

In an exemplary embodiment, the threshold voltage 524 may be selected based on a known relationship between the common mode component magnitude and the common mode signal. The selected threshold voltage may be a voltage at which one or more of the capacitors of the accelerometers is outside of acceptable tolerances (e.g., based on manufacturing defect, damage, misalignment, or improper positioning). If the voltage of the common mode signal exceeds the threshold voltage 524, a "high" signal may be output from comparator 522 as test output 378, thus indicating that the accelerometer should cease operation. The test output 378 may be provided to other processing circuitry 14 for appropriate actions and notifications.

In other exemplary embodiments (not depicted in FIG. 5), comparison may be made in other manners, for example, by comparison with a plurality of thresholds or by analysis of the common mode signal over time (e.g., to identify patterns, changes, etc.). In one exemplary embodiment of comparison circuit 406, the common mode signal may be compared to one or more thresholds. As described herein, the common mode signal may change based on the magnitude of the common mode component, which in turn may change based on the severity of a capacitor anomaly. The severity of the capacitor anomaly may be determined based on how the common mode signal compares to multiple threshold values. Although suitable values and thresholds may be compared in a variety of manners, in an exemplary embodiment a more severe capacitor anomaly correspond to an increase in the common mode signal.

In an embodiment, a plurality of comparisons may be performed for a plurality of thresholds, such that different signal levels for the comparison circuit may result in different responses or notifications. In an exemplary embodiment, three thresholds ($V_{TH1}$, $V_{TH2}$, and $V_{TH3}$) may be utilized for comparison, with each threshold corresponding to a different possible anomaly severity level. Although the comparison may be performed in a variety of manners, in an embodiment each of the thresholds may correspond to an analog voltage that is input to a respective comparator, with the common mode signal being compared to each of the thresholds. In an embodiment where an increase in the magnitude of the common mode signal corresponds to a greater degree of a sensed capacitor anomaly, a threshold $V_{TH1}$ may be less than a threshold $V_{TH2}$, which may be less than a threshold $V_{TH3}$. A common mode signal voltage value less than $V_{TH1}$ may correspond to a normal operating condition. A comparison voltage greater than $V_{TH1}$ and less than $V_{TH2}$ may indicate a first error condition. A comparison voltage greater than $V_{TH2}$ and less than $V_{TH3}$ may indicate a second error condition that is more severe than the first error condition. Finally, a comparison voltage greater than $V_{TH3}$ may indicate a third error condition at a highest severity level.

In an embodiment, the outputs from the comparators may be processed by comparison circuit 406 or may be provided to other of processing circuitry 14 for further processing. These outputs may be processed to perform alarm and compensation processing. The alarm and compensation processing may be programmable, such that different actions may be taken based on different severity levels. Exemplary actions include providing notifications, generating alarms, ceasing the operation of the accelerometer, modifying operational parameters of the accelerometer, modifying gain values that are applied to the acceleration output signal, modifying output data from the accelerometer (e.g., based on scaling factors or data from other sensors), other suitable operations, and any suitable combination thereof.

In an exemplary embodiment, under normal operating conditions the accelerometer may continue to operate normally and no notifications may be provided (e.g. other than a notification of normal operation). In the case of a first error condition, a warning notification of the existence of an error may be provided and the output data from the accelerometer may be modified to adjust for the error (e.g., a first type of compensation). In the case of a second more severe error condition, a warning notification of the existence of an error may be provided and operational parameters (e.g., modifications to sense drive signals, application of signals to compensation electrodes, etc.) may be performed in an attempt to compensate for the error (e.g., a second type of compensation). In an embodiment, modification of output values may also be performed in response to the second error condition. In the case of the third error condition, it may be determined that the accelerometer should cease to operate, and a notification may be provided that causes the shutdown of the accelerometer.

In some embodiments, the alarm and compensation processing may retain a memory of previous error conditions and responses, such that different compensation techniques may be performed based on the efficacy of the technique, and may be combined based on particular compensation that is presently being performed. For example, if a modification to an operational parameter successfully caused the accelerometer to move from the second error condition to the normal condition or the first error condition, the modification to the operational parameter may be maintained. In another example, different modifications of output data may correspond to different changes in operational parameters, and may be employed based upon the change in operational parameters that is used to remedy an error.

Figure 6:
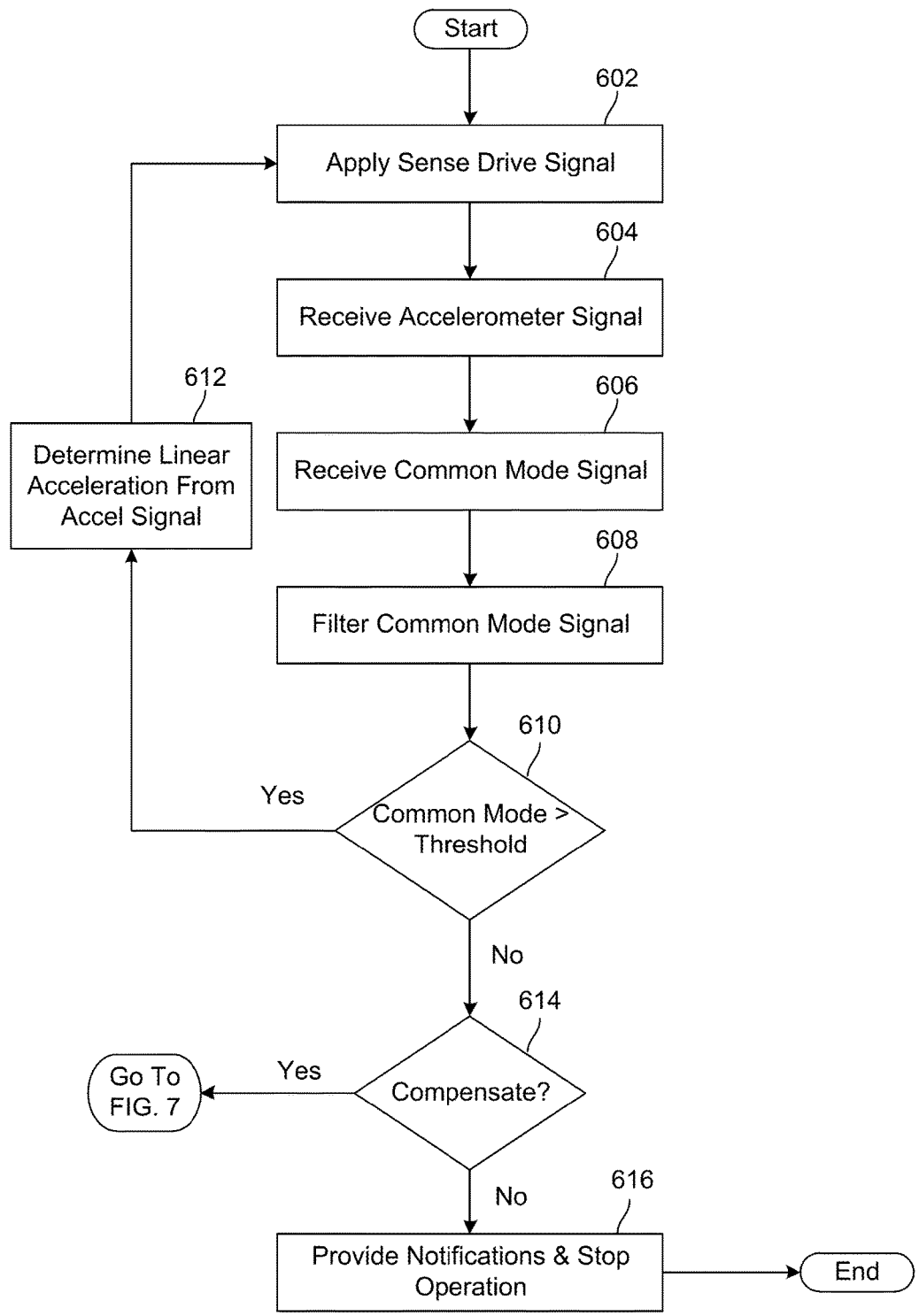
FIG. 6 shows exemplary steps for determining identifying a common mode error of an accelerometer in accordance with some embodiments of the present disclosure.
Figure 7:
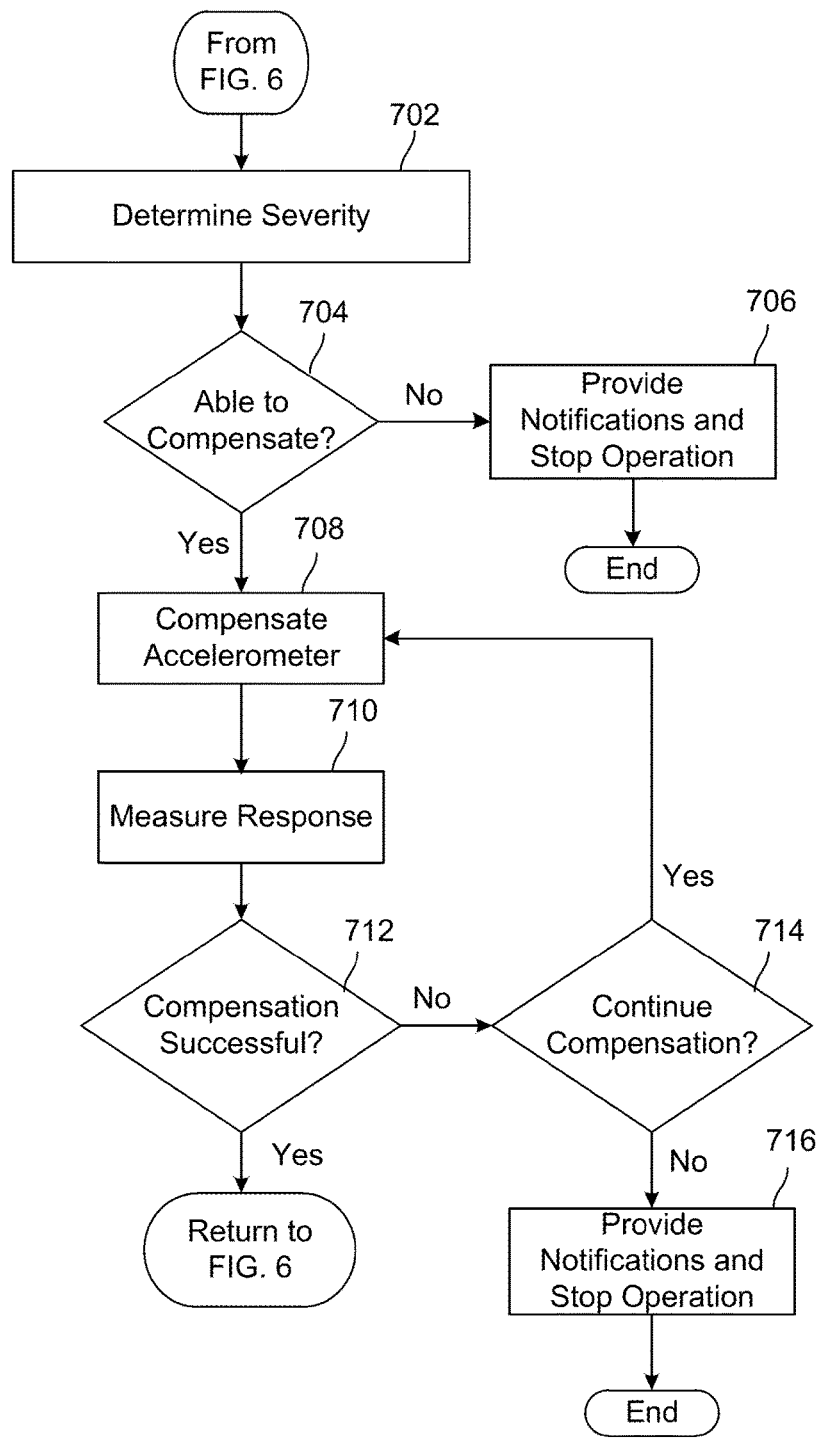
FIG. 7 shows exemplary steps for compensating for a common mode error of an accelerometer in accordance with some embodiments of the present disclosure.

FIGS. 6-7 depict exemplary steps for identifying capacitor anomalies according to some embodiments of the present disclosure. Although FIGS. 6-7 are described in the context of the present disclosure, it will be understood that the methods and steps described in FIGS. 6-7 may be applied to a variety of sensor and accelerometer designs, signal paths, errors, and compensation techniques. Although a particular order and flow of steps is depicted in FIGS. 6-7, it will be understood that in some embodiments one or more of the steps may be modified, moved, removed, or added, and that the flow depicted in FIGS. 6-7 may be modified.

FIG. 6 depicts exemplary steps for utilizing a common mode signal to identify a capacitor anomaly in accordance with some embodiments of the present disclosure. As described herein, an exemplary accelerometer may include test circuitry coupled to receive capacitance signals from capacitors formed by the proof masses and sense electrodes of the accelerometer.

At step 602, a sense drive signal may be applied to the sense electrodes. The sense drive signal may have a sense drive frequency, and in some embodiments, may be provided as a differential signal to different ones of the sense electrodes. Once the sense drive signal has been applied to the sense electrodes, processing may continue to step 604.

At step 604, accelerometer processing circuitry may receive capacitance signals from the capacitors. As described herein, the capacitance signals may vary based on the movement of the proof masses relative to the sense electrodes and the periodic sense drive signal. Once the capacitance signals have been received by the accelerometer processing circuitry, processing may continue to step 606.

At step 606, test circuitry may receive the capacitance signals from the capacitors. In an embodiment, the capacitance signals may be received by input circuitry, which may include components (e.g., a current source, transistors, and a capacitor) to determine a raw common mode signal based on the received capacitance signals. The raw common mode signal may be representative of a common mode component of the capacitance signals. Once the raw common mode signal is determined, processing may continue to step 608.

At step 608, the raw common mode signal may be processed in order to generate a common mode signal that is suitable for analysis. Although the processing may be performed in a variety of manners, in an embodiment an amplifier with a feedback RC circuit provide for removal of AC portions and noise from the raw common mode signal and may provide for a suitable dynamic range for the common mode signal. Once the common mode signal is determined at step 608, processing may continue to step 610.

At step 610, the common mode signal may be compared to one or more thresholds. In exemplary embodiment as described herein, the voltage of the common mode signal may be increased based on the severity of the capacitor anomaly, such that a higher voltage corresponds to a more severe anomaly. In an exemplary embodiment of multiple thresholds, the processing may continue to step 612 if all of the thresholds are exceeded, or in some embodiments, if only a warning threshold is exceeded. At step 612, acceleration may be determined based on a response to the sense drive signal, and processing may return to step 602. If the common mode signal is greater than the threshold or thresholds, or in some embodiments, is greater than a threshold associated with a requirement to stop operation or to compensate for operation, processing may continue to step 614.

At step 614, the processing circuitry may determine whether compensation may be performed in response to the anomaly, or whether the accelerometer should cease operation in response to the error. If compensation may be performed, processing may continue to the processing described in FIG. 7. If compensation may not be performed, processing may continue to step 616, where notifications may be provided and the accelerometer may cease operating (e.g., voltage may be removed from some or all components of the accelerometer, the sense drive signal may no longer be provided, etc.). The processing of FIG. 6 may then end.

FIG. 7 shows exemplary steps for compensating for a capacitor anomaly in accordance with some embodiments of the present disclosure. The processing of FIG. 7 may be performed if an anomaly has been identified in the steps of FIG. 6 (e.g., due to the voltage of the common mode signal falling below one or more threshold voltages) and if compensation for errors is allowed within the particular accelerometer.

At step 702, the severity of the anomaly may be determined, e.g., based on the value for the voltage for the common mode signal. In an embodiment, the severity may be based on comparison of the common mode signal to a plurality of thresholds (e.g., at a plurality of comparators) in order to identify one of a plurality of anomaly conditions. In an embodiment, one or more of the anomaly conditions may be associated with a severity, either alone or considered in concert with other available information (e.g., compensation or acceleration data history, simultaneous acceleration data, etc.). Once the severity is determined, processing may continue to step 704.

At step 704, it may be determined whether compensation is possible based on the severity of the anomaly. In an embodiment, one or more error conditions or severity levels may be associated with different responses. If the anomaly condition or severity level does not permit compensation, processing may continue to step 706, where notifications may be provided and the accelerometer may cease operating (e.g., voltage may be removed from some or all components of the accelerometer, the sense drive signal may no longer be provided, etc.). The processing of FIG. 7 may then end. If compensation is possible, processing may continue to step 708.

At step 708, it may be determined what type of compensation is possible based on the severity of the error. Although a variety of suitable types of compensation may be possible, in an embodiment the types of compensation may involve modification of the output data from the accelerometer (e.g., by modifying scaling factors) or modification of operational parameters of the accelerometer (e.g., by modifying a sense drive signal or providing compensating signals to compensation electrodes). Different severity levels may be associated with different compensation types, and in some embodiments, different compensation techniques within the different types. In some embodiments, additional information such as historical compensation information or accelerometer data, or current accelerometer data, may be considered when determining a compensation type. Once the compensation to be performed has been determined, the compensation may be implemented and processing may continue to step 710.

At step 710, the response to the compensation may be measured. In an embodiment in which a scaling factor is modified, a change such as a change in acceleration output values or other signal values impacted by the scaling may be measured. In an embodiment of modification of operational parameters, changes in responses to the sense drive signal and/or auxiliary drive signal may be determined. Once the response has been measured at step 710, processing may continue to step 712.

At step 712, it may be determined whether the compensation has been successful. In an exemplary embodiment, the measured response values at step 714 may be compared to expected measured response values based on the compensation. If the measured response values correspond to expected values (e.g., within a threshold window), the processing may return to step 602 of FIG. 6. If the measured response values do not correspond to expected values (e.g., within a threshold window), processing may continue to step 714.

At step 714, it may be determined whether the compensation should continue. In an exemplary embodiment, if the measured response values show improvement in the output date or a reduction in the common mode component of the capacitance signals, compensation may continue in a number of steps or multiple compensation techniques may be employed in order to attempt to bring the measured response within acceptable bounds. If the compensation may continue, processing may return to step 708. If the compensation may not continue, processing may continue to step 716, where notifications may be provided (e.g., that compensation failed) and the accelerometer may cease operating (e.g., voltage may be removed from some or all components of the accelerometer, the sense drive signal may no longer be provided, etc.). The processing of FIG. 7 may then end.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A system for identifying at least one capacitor error of an accelerometer, comprising:
    a first proof mass suspended to move along a sense axis in response to a linear acceleration along the sense axis;
    a second proof mass suspended to move along the sense axis in response to a linear acceleration along the sense axis;
    a first sense electrode located adjacent to the first proof mass, wherein the first sense electrode and the first proof mass comprise a first capacitor;
    a second sense electrode located adjacent to the second proof mass, wherein the second sense electrode and the second proof mass comprise a second capacitor;
    processing circuitry coupled to the first proof mass, the second proof mass, the first sense electrode, and the second sense electrode to apply a first sense drive signal having a sense drive frequency to the first capacitor and a second sense drive signal having the sense drive frequency to the second capacitor, to receive a capacitance signal from each of the first and second capacitors, to identify a common mode signal for the capacitance signals, and to identify the at least one capacitor error based on the common mode signal.

2. The system of claim 1, wherein the processing circuitry identifies the at least one capacitor error based on the magnitude of the common mode signal.

3. The system of claim 1, wherein the at least one capacitor error comprises damage to one or more of the first sense electrode, the second sense electrode, the first proof mass, or the second proof mass.

4. The system of claim 1, wherein the at least one capacitor error comprises misalignment of one or more of the first sense electrode, the second sense electrode, the first proof mass, or the second proof mass.

5. The system of claim 1, wherein each of the first sense electrode, the second sense electrode, the first proof mass, and the second proof mass comprises a plurality of sense combs, and wherein the at least one capacitor error comprises damage to one or more of the plurality of sense combs.

6. The system of claim 1, wherein the at least one capacitor error is identified based on the magnitude of the common mode signal and a threshold.

7. The system of claim 6, wherein the processing circuitry further comprises a comparator that compares the magnitude of the common mode signal and the threshold, and outputs a value indicative of the at least one capacitor error when the magnitude of the common mode signal exceeds the threshold.

8. The system of claim 1, wherein the at least one capacitor error comprises a plurality of capacitor errors, wherein in response to a first capacitor error the processing circuitry applies compensation to the accelerometer, and in response to a second capacitor error the processing circuitry causes the accelerometer to cease operation.

9. The system of claim 8, wherein the first capacitor error corresponds to the common mode signal having a magnitude greater than a first threshold, and wherein the second capacitor error corresponds to the common mode signal having a magnitude greater than a second threshold, and wherein the second threshold is greater than the first threshold.

10. The system of claim 8, wherein the compensation comprises modifying a scaling driver or modifying one or more of the first sense drive signal and the second sense drive signal.

11. The system of claim 1, wherein the first sense drive signal and the second sense drive signal are differential signals.

12. The system of claim 1, wherein the processing circuitry comprises an input circuitry that receives the capacitance signals and outputs a voltage that is proportional to the common mode component of the capacitance signals.

13. The system of claim 12, wherein the processing circuitry comprises amplifier circuitry coupled to the input circuitry to amplify the common mode signal based on the output voltage of the input circuitry.

14. The system of claim 12, wherein the input circuitry comprises a plurality of transistors and a capacitor, wherein each of the capacitance signals is coupled to one of the plurality of transistors, and wherein the plurality of transistors allow the capacitor to charge when a common mode component of the capacitance signals is received at the plurality of transistors.

15. The system of claim 1, wherein the processing circuitry determines linear acceleration based on the capacitance signals.

16. The system of claim 1, wherein each of the first sense electrode and the second electrodes is located at the same relative distance to its associated first proof mass or second proof mass when the first proof mass and second proof mass are not subject to linear acceleration.

17. The system of claim 1, wherein a magnitude of the common mode signal is proportional to a change in capacitance due to the at least one capacitor error.

18. The system of claim 1, further comprising a substrate located in a plane that is parallel to the first proof mass and the second proof mass, wherein the first sense electrode and the second sense electrode are fixedly attached to the substrate.

19. A method for identifying a capacitor error of an accelerometer, comprising:
applying a first sense drive signal having a sense drive frequency to a first capacitor, wherein the first capacitor comprises a first proof mass suspended to move along a sense axis in response to a linear acceleration along the sense axis and a first sense electrode located adjacent to the first proof mass;
applying a second sense drive signal having the sense drive frequency to a second capacitor,
wherein the second capacitor comprises a second proof mass suspended to move along the sense axis in response to a linear acceleration along the sense axis and a second sense electrode located adjacent to the second proof mass;
receiving a capacitance signal from each of the first and second capacitors;
identifying a common mode signal for the capacitance signals; and
identifying the capacitor error based on the common mode signal.

20. A system for identifying a capacitor error of an accelerometer, comprising:
at least two first sense electrodes, wherein a first sense drive signal having a sense drive frequency is applied to each of the first sense electrodes;
at least two second sense electrodes, wherein a second sense drive signal having the sense drive frequency is applied to each of the second sense electrodes, and wherein the first sense drive signal and the second sense drive signal are differential signals;
a first proof mass, wherein the first proof mass is located adjacent to one of the first sense electrodes and adjacent to one of the second sense electrodes;
a second proof mass, wherein the second proof mass is located adjacent to another of the first sense electrodes, and to another of the second sense electrodes; and
processing circuitry coupled to receive a first capacitance signal from the first proof mass and the second capacitance signal from the second proof mass, to identify a common mode signal for the capacitance signals, and to identify the capacitor error based on the common mode signal.

* * * * *